US012366675B2

(12) United States Patent
Yu (10) Patent No.: US 12,366,675 B2
(45) Date of Patent: Jul. 22, 2025

(54) NON-LINEAR SOLUTION TO SEISMIC DATA CONDITIONING USING TRAINED DICTIONARIES (71) Applicant: BP Corporation North America Inc., Houston, TX (US)

(72) Inventor: Zhou Yu, Katy, TX (US)

(73) Assignee: BP CORPORATION NORTH AMERICA INC., Houston, TX (US)

(*) Notice: Subject to any disclaimer, the term of this patent is extended or adjusted under 35 U.S.C. 154(b) by 692 days.

(21) Appl. No.: 17/761,686

(22) PCT Filed: Nov. 5, 2020

(86) PCT No.: PCT/US2020/059032
§ 371 (c)(1),
(2) Date: Mar. 18, 2022

(87) PCT Pub. No.: WO2021/108099
PCT Pub. Date: Jun. 3, 2021

(65) Prior Publication Data
US 2022/0390636 A1 Dec. 8, 2022

Related U.S. Application Data (60) Provisional application No. 62/941,106, filed on Nov. 27, 2019.

(51) Int. Cl.
G01V 1/36 (2006.01)
G01V 1/32 (2006.01)
G01V 1/34 (2006.01)

(52) U.S. Cl.
CPC .............. G01V 1/364 (2013.01); G01V 1/325 (2013.01); G01V 1/345 (2013.01)

(58) Field of Classification Search
CPC ........ G01V 1/364; G01V 1/325; G01V 1/345; G01V 2210/23; G01V 2210/322; G01V 2210/48; G01V 1/368; G01V 1/362
See application file for complete search history.

(56) References Cited

U.S. PATENT DOCUMENTS

2011/0213556 A1* 9/2011 Yu .......................... G01V 1/368
702/14
2013/0286782 A1 10/2013 Vyas et al.
(Continued)

FOREIGN PATENT DOCUMENTS

GB 2534931 A * 8/2016 ............. G01V 1/302

OTHER PUBLICATIONS

Loris et al., "Nonlinear regularization techniques for seismic tomography", Oct. 17, 2009, Journal of Computational Physics 229 (2010), pp. 890-905. (Year: 2009).*

(Continued)

Primary Examiner — Mi'schita' Henson
(74) Attorney, Agent, or Firm — CONLEY ROSE, P.C.

(57) ABSTRACT

Techniques to reduce noise in seismic data by receiving a set of seismic data comprising a plurality of input volumes each inclusive of positional data and at least one additional attribute related to the seismic data, selecting a first input volume of the plurality of input volumes having a first additional attribute related to the seismic data, and generating a pilot volume by selecting a range of input volumes of the plurality of input volumes and stacking input volumes of the range of input volumes with the first input volume. Additionally, generating a trained dictionary based upon transformation of the pilot volume, transforming the first input volume into transformed data, imposing a sparse condition on the transformed data utilizing the trained dictionary to generate sparsified data, and inverse transform- (Continued)

ing the sparsified data to generate an output data volume as a portion of a set of modified seismic data.

20 Claims, 7 Drawing Sheets

(56) References Cited

U.S. PATENT DOCUMENTS

2017/0108604 A1* 4/2017 Turquais .................. G01V 1/38
2020/0408943 A1* 12/2020 Qin ......................... G01V 1/362

OTHER PUBLICATIONS

Elad et al., "Image Denoising: The Deep Learning Revolution and Beyond—A Survey Paper—", Jan. 9, 2023, arXiv:2301.03362v1, pp. 1-62 (Year: 2023)*
PCT/US2020/059032 International Search Report and Written Opinion dated Feb. 22, 2021 (13 p.).
PCT/US2020/059032 Response to Written Opinion dated Feb. 22, 2021 and Article 19 Amendments (19 p.).
Zhu, Lingchen et al., "Seismic Data Denoising Through Multiscale and Sparsity-Promoting Dictionary Learning," Geophysics, vol. 80, No. 6, Nov. 1, 2015, pp. WD45-WD57 (15 p.).
Yu, Zhou et al., "Attenuation of Noise and Simultaneous Source Interference Using Wavelet Denoising," Geophysics,—vol. 82, No. 3, May 1, 2017, pp. V179-V190 (12 p.).
Yu, Zhou et al., "A Nonlinear Solution to 3D Seismic Data Conditioning Using Trained Dictionaries," Geophysics, vol. 85, No. 5, Sep. 1, 2020, pp. V-397-V406 (10 p.).

* cited by examiner

NON-LINEAR SOLUTION TO SEISMIC DATA CONDITIONING USING TRAINED DICTIONARIES

CROSS-REFERENCE TO RELATED APPLICATIONS

This application is a 35 U.S.C. § 371 U.S. National Stage Entry application of PCT/US2020/059032 filed Nov. 5, 2020, and entitled "Non-Linear Solution to Seismic Data Conditioning Using Trained Dictionaries," which claims benefit of U.S. provisional patent application Ser. No. 62/941,106 filed Nov. 27, 2019, and entitled "Non-Linear Solution To Seismic Data Conditioning Using Trained Dictionaries," each of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to seismic image generation, and more specifically, to construction modification of seismic data used in the generation of seismic images for seismic exploration and/or surveillance.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth.

The seismic data recorded by the receivers may be used to create an image or profile of the corresponding subsurface region, for example to be used in reservoir characterization. Creation of the images or profiles of a subsurface region is generated via seismic processing of the seismic data. However, the seismic data collected (recorded) can include undesired noise and/or artifacts that result in reductions in the quality of the images or profiles of a subsurface region generated. Accordingly, it is desirable to separate the seismic signals from noise in the seismic data to improve the resulting images or profiles of a subsurface region, thus leading to improved reservoir characterization.

SUMMARY

A summary of certain embodiments disclosed herein is set forth below. It may be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic analysis for reservoir characterization has been a primary focus for the geophysical community for decades. One of the critical steps in delivering high-quality seismic data for seismic analysis is to remove undesirable pre-stack seismic phenomena (e.g., noise) prior to seismic data analysis, such as amplitude versus offset (AVO) analysis. Present embodiments to reduce undesirable pre-stack seismic phenomena utilize a three-dimensional (3D) non-linear approach. This approach includes an understanding that a subsurface geological formation (e.g., a 3D geological structure) should be invariant from offset to offset. Thus for offsets (e.g., the horizontal distance between a source and a receiver) having the same or similar values, the subsurface geological formation (e.g., a 3D geological structure) determined at these selected offsets should be invariant.

Trained dictionaries, generated by 3D complex wavelet transformation over pilot volumes selected to include offsets having similar values or angles, are progressively constructed by stacking over the selected offsets or angles. A sparse non-linear approximation is imposed on the seismic data against the trained dictionaries after applying a 3D complex wavelet transform to the data. An inverse 3D complex wavelet transform may be applied to the sparsified coefficients to return to the data space (e.g., data domain) from a wavelet domain. This process can be repeated for all offsets or angles in a survey (i.e., on all seismic data for a particular region). The process includes speed and accuracy benefits over traditional seismic data conditioning techniques.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Improvements to the processing of the seismic data and subsequent image generation may be made through improvements to the seismic data, such as by reducing the amount of noise interfering with the seismic signals present in seismic data. By utilizing a non-linear seismic data conditioning technique using a combination of three-dimensional (3D) complex wavelet transform, sparse conditioning, and trained dictionaries from a pilot volume, reductions in noise present in seismic data to be processed may be accomplished. The technique leverages the principle that 3D geology is continuous (invariant) over the offset dimension and the technique is utilized on each offset or angle volume of a set of seismic data independently and without the use of any 2D gather based process. Trained dictionaries are generated by 3D complex wavelet transformation over the pilot volumes that are progressively constructed by stacking over selected offsets or angles. A sparse non-linear approximation (e.g., under L0 norm) is then imposed on the data against the trained dictionaries, where the data was previously transformed using a 3D complex wavelet transform. Thereafter, an inverse 3D complex wavelet transform is applied to the sparsified coefficients to return to the data space (i.e., from the wavelet domain).

The process is highly automated and requires minimal input. As such, the process can be a fast and efficient process. The technique can improve signal-to-noise ratios significantly while preserving valuable seismic attributes, including amplitude versus offset (AVO) signatures, and can be highly effective at attenuating coherent noises, including multiples. The seismic data produced by the present technique can then be processed to generate improved resulting images or profiles of a subsurface region, thus leading to improved reservoir characterization.

Figure 1:
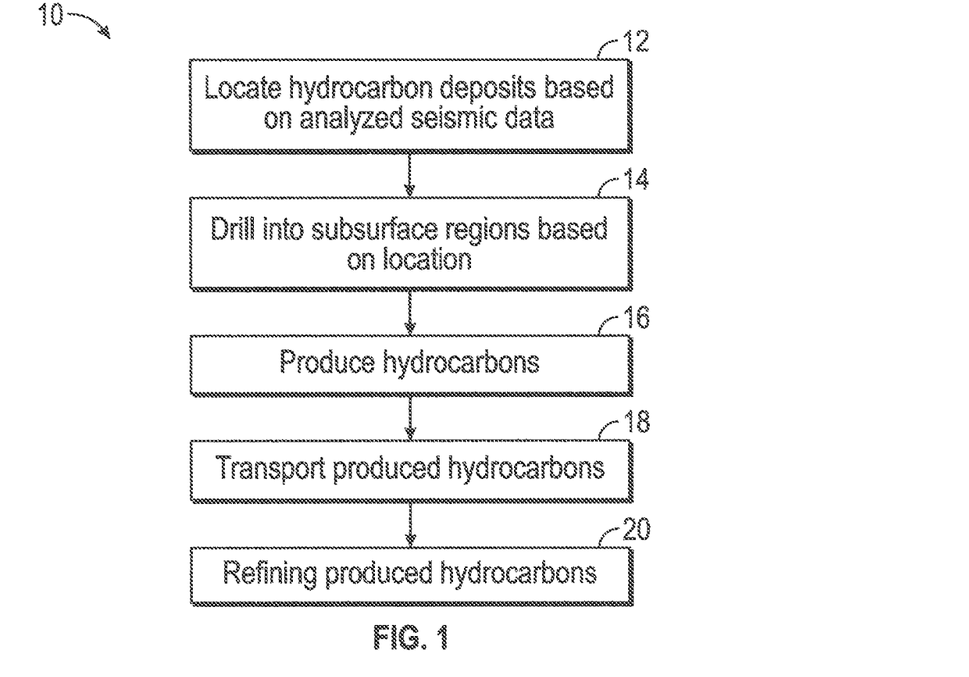
FIG. 1 illustrates a flow chart of various processes that may be performed based on analysis of seismic data acquired via a seismic survey system, in accordance with embodiments presented herein.
Figure 2:
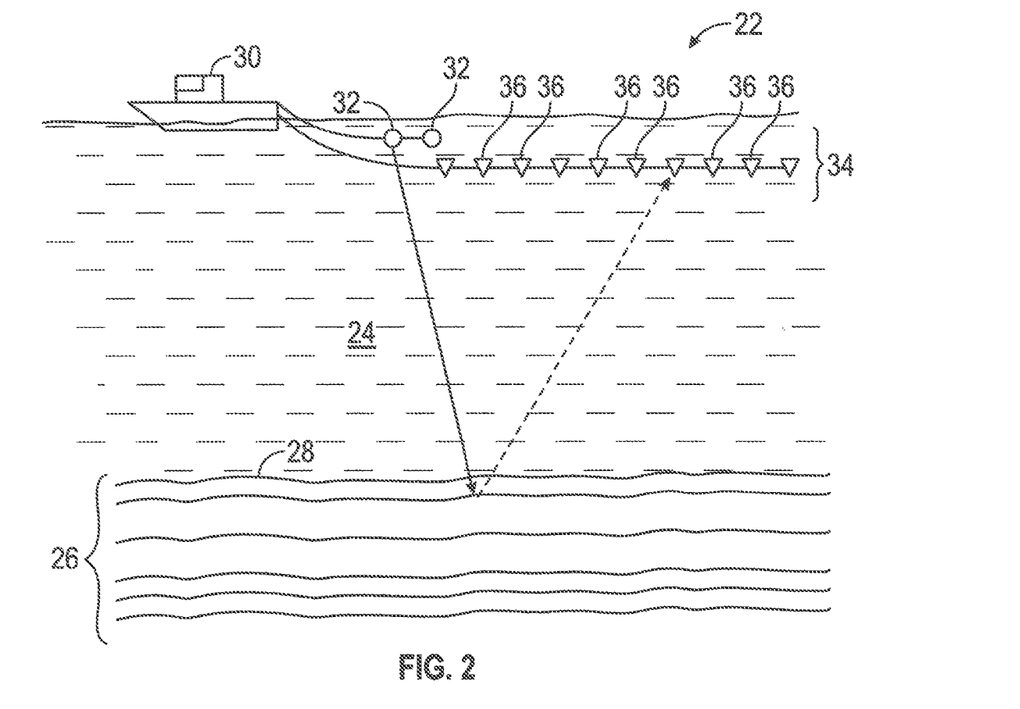
FIG. 2 illustrates a first survey system in a marine environment, in accordance with embodiments presented herein.
Figure 3:
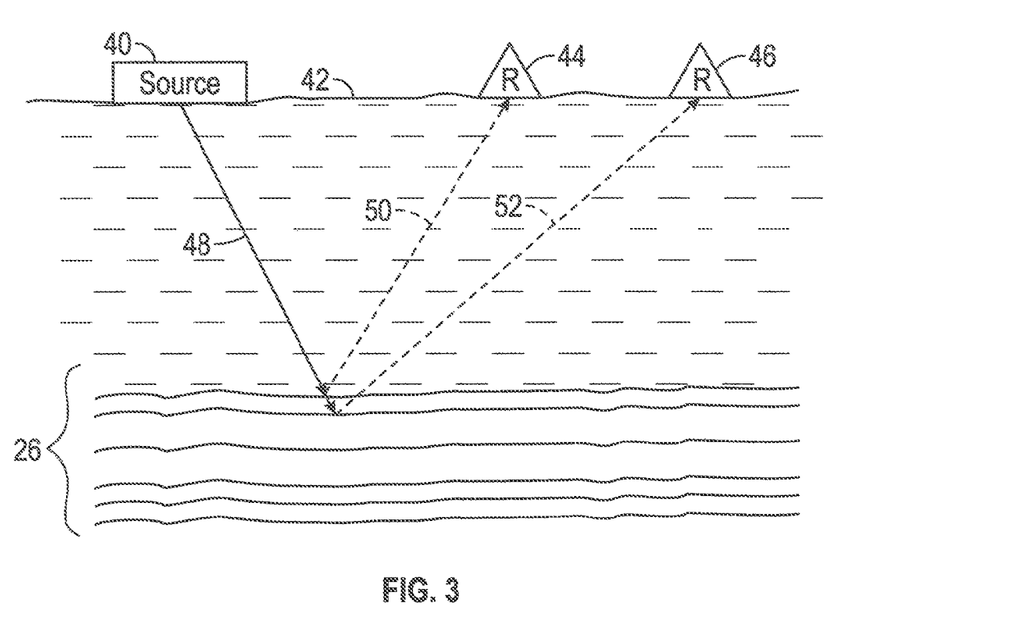
FIG. 3 illustrates a first survey system in a land environment, in accordance with embodiments presented herein.

By way of introduction, seismic data may be acquired by using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a seismic streamer 34, a seismic receiver 36, and/or other equipment that may assist in acquiring seismic images representative of geological formations within a subsurface region 26 of the Earth. The vessel 30 may tow the seismic source 32 (e.g., an air gun array) that may produce energy, such as sound waves (e.g., seismic waveforms), that is directed at a seafloor 28. The vessel 30 may also tow the seismic streamer 34 having a seismic receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one seismic receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, seismic streamers 34, and the like to perform the operations of the marine survey system 22.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) that may be disposed on a surface 42 of the Earth above the subsurface region 26 of interest. The seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the seismic source 40 may be reflected off of the geological formations and acquired or recorded by one or more land-based seismic receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second seismic receiver 46 may receive the reflection of the seismic waveform 48 off of a different geological formation. As such, the first seismic receiver 44 may receive a reflected seismic waveform 50 and the second seismic receiver 46 may receive a reflected seismic waveform 52.

Figure 4:
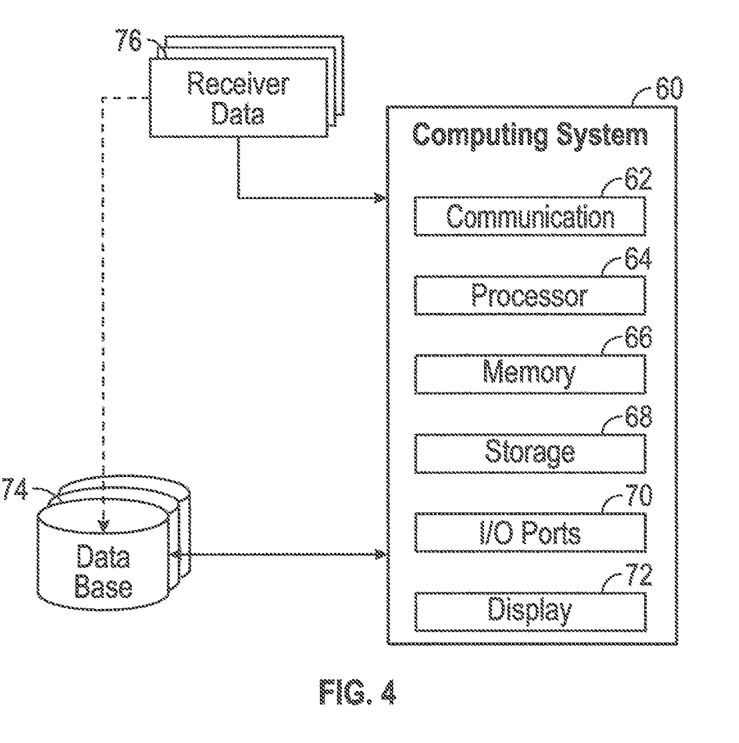
FIG. 4 illustrates a computing system that may perform operations described herein based on data acquired via the marine survey system of FIG. 2 and/or the survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the seismic receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the seismic receivers 36, 44, 46, one or more databases 74, other computing devices, and other communication capable devices. In one embodiment, the computing system 60 may receive receiver data 76 (e.g., seismic data, seismograms) that may have been previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent tangible, non-transitory, machine-readable media or non-transitory computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, and the like. The display 72 may be any suitable type of display, such as a liquid crystal display (LCD), plasma display, or an organic light emitting diode (OLED) display, for example. In addition to depicting the visualization described herein via the display 72, it may be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and control certain operations of the seismic sources 32 or 40, the seismic receivers 36, 44, 46, and the like. Further, it may be noted that the listed components are provided as example components and the embodiments described herein are not to be limited to the components described with reference to FIG. 4.

In some embodiments, the computing system 60 (and more specifically, the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that contain the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
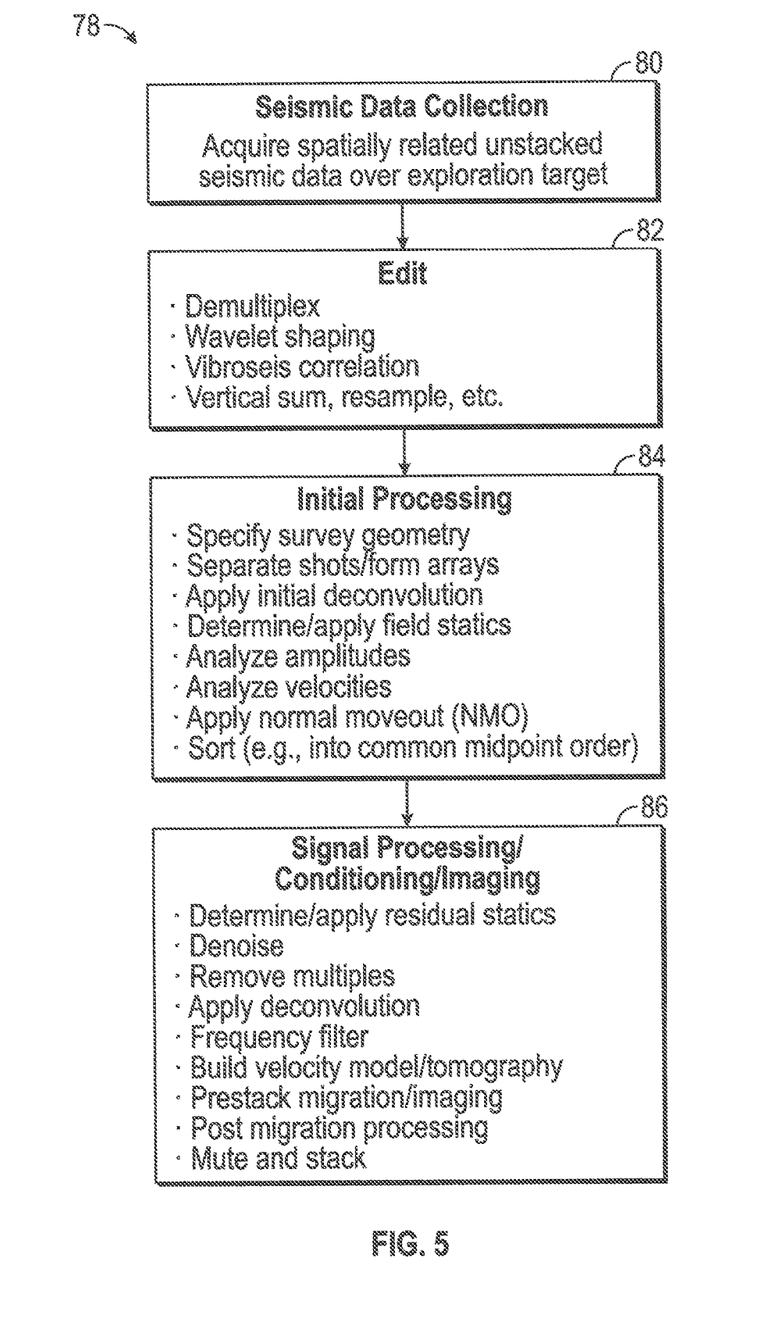
FIG. 5 illustrates a flow chart of a method for generating a seismic image via the computing system of FIG. 4, in accordance with embodiments presented herein.

In some embodiments, a seismic image may be generated in conjunction with a seismic processing scheme such as, for example, the method 78 illustrated in FIG. 5 by the computing system (and more specifically, the processor 64 operating in conjunction with at least one of the memory 66 or the storage 68). As illustrated, method 78 includes a seismic processing sequence that includes seismic data collection in step 80, editing of the seismic data in step 82, initial processing in step 84, and signal processing, conditioning, and imaging (which may, for example, include production of imaged sections or volumes) in step 86 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result of the method 78, location of hydrocarbons within a subsurface region 26 may be identified. Location of these hydrocarbons contained in hydrocarbon deposits may be based, at least in part, on the performance of processes in step 86, inclusive of pre-stack depth migration techniques used, for example, with surface common image gathers (CIGs), whereby the pre-stack depth migration techniques benefit from correction of an applied velocity model used in computing pre-stack depth migration data. Furthermore, techniques described herein, for example, with respect to FIG. 7, can be used in place of the conditioning processes illustrated in step 86.

Figure 6:
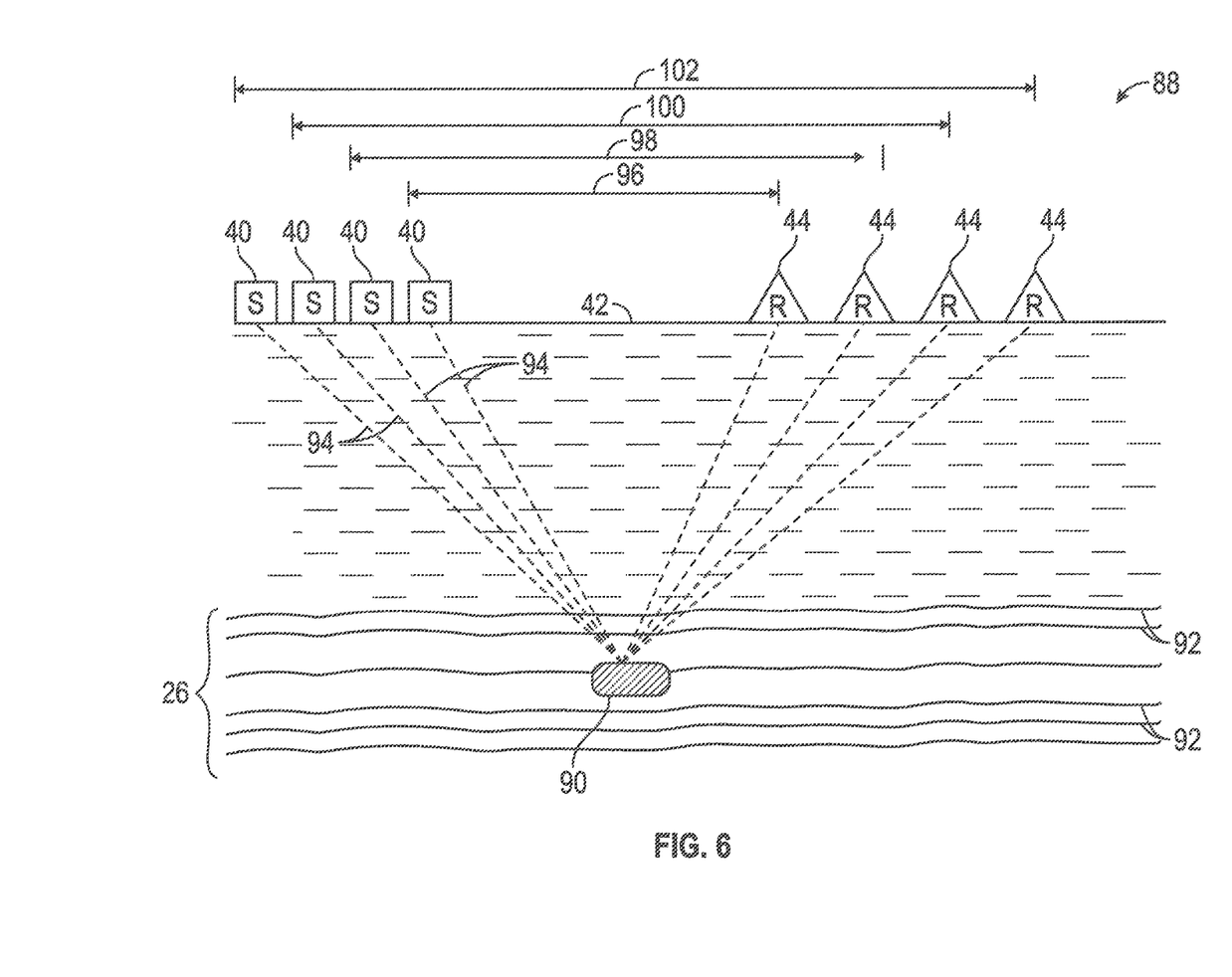
FIG. 6 illustrates a second survey system in a land environment, in accordance with embodiments presented herein.

FIG. 6 illustrates a land survey system 88 (although the illustrated example can also be applied to a marine system, for example, in place of marine survey system 22) that may be employed to obtain information regarding the subsurface region 26 of the Earth when the subsurface region 26 includes a geological feature 90 (e.g., a 3D geological structure or geological formation), in addition to relatively consistent reflectors 92. As illustrated, each of the seismic sources 40 transmits a seismic wave 94 (i.e., a shot) to a common target (geological feature 90) that is reflected and received by a respective seismic receiver 44. Each seismic source 40 and respective receiver 44 illustrated in the land survey system has an offset 96, 98, 100, or 102 associated therewith, wherein the offsets 96, 98, 100, and 102 represent the distance between the transmitting seismic source 40 and the corresponding seismic receiver 44). When utilizing the received data (i.e., time series recorded data or traces) having variable surface offsets 96, 98, 100, and 102 when generating a seismic image, the seismic data may be separated as a function of the respective seismic source 40 and seismic receiver 44 distances (i.e., offsets 96, 98, 100, and 102). A velocity estimate may be made, and a series of images can be generated, where each separate image is created from a subset of the full dataset. The subset is characterized by containing traces with some range of seismic source 40 to seismic receiver 44 offsets that is distinct from the other subsets. If the velocity estimate is correct, all of the gathered images as a function of their respective surface offsets would occur at a given (i.e., consistent) depth (i.e. the depth of a reflector of interest, such as, geological feature 90 or other common point).

These offsets 96, 98, 100, and 102 can be useful, as the geological feature 90 should be invariant (e.g., continuous) from one offset (e.g., offset 96) to another offset (e.g., 102). Thus for seismic sources 40 and seismic receivers 44 having the same (or similar) values of an offset (e.g., offset 96), the geological feature 90 determined at the selected offset (e.g., offset 96) should be invariant across any seismic source 40 and seismic receiver 44 having that offset (e.g., offset 96). The same holds true for seismic sources 40 and seismic receivers 44 having the same (or similar) angles to a common point (e.g., geological feature 90) and can be operated on consistent with the techniques described below.

The present techniques described herein can be used to increase seismic signal to noise values of seismic data, utilizing non-linear approximations, whereby the approximation is not from linear space, but rather from a non-linear one, where the output occupies a broad spectrum of predictable to unpredictable. The techniques also utilize analytical basis functions, or "dictionaries" that have traditionally been used for various transformations, such as an exponential function in Fourier transform, a coiflet wavelet, or a complex wavelet in wavelet transforms. For example, the present techniques can apply two stages of non-linear approximation, where the target function is used both to choose the dictionaries from a pre-defined library of bases, and then to choose the best n-term approximation relative to the trained libraries as a form of highly non-linear approximation. Described below is a sparse approximation problem as well as an example of imposing a sparse non-linear condition using data-driven dictionary as a precursor to the technique described in FIG. 7.

A sparse approximation problem is described as follows. A function, Y, can be represented in terms of linear superposition of a basis function, ϕ:

$$Y = \sum_{n \subset I_k} C_n \phi \quad (1)$$

Where n is an integer; $I_k$ is an integer set; $C_n$ are coefficients and can be estimated by (assuming $\phi_n$ is orthogonal):

$$C = \sum_{n \subset I_k} \phi_n^T y \quad (2)$$

Where $\emptyset^T$ is the transpose of $\emptyset_n^T$. Basis ϕ becomes a dictionary when it is a function of variables of y.

For instance, the exponential function of a Fourier transform is not a dictionary, but a short time-windowed Fourier transform (STFT) is a dictionary. Wavelet basis is a dictionary that varies with spatial variables, while an orthonormal basis is generated from the dilation and translation of a single scaling function. A trained dictionary is a dictionary that is not pre-specified. The transform process can achieve compaction—the ability to capture a significant part of the signal with only a few coefficients $\{C_n\}$—if the right choice of basis is used, like complex wavelet basis, which will be discussed subsequently in greater detail.

An example of a linear superposition is:

$$Y(x, y, z) = \sum_{n \subset I_k} C_n \phi_n(x, y, z) \quad (3)$$

A few sequential coefficients can capture a significant part of the signal. In contrast, an example of a non-linear superposition is:

$$Y(x, y, z) = \sum_{n \subset I_k(Y)} C_n \phi'_n(x, y, z) \quad (4)$$

Where $I_k(Y)$ is an index set adaptive to each signal individually.

Compaction represents data with a minimal number of samples while sparsity represents data with a minimal number of active samples. Therefore, increasing sparsity requires departure from the linear model, towards a more flexible non-linear formulation. The objective function is defined as:

$$Min \left\| Y_{obs} - \sum_{n \subset kI_k(Y)} C_n \phi'_n(x, y, z) \right\| \quad (5)$$

Subject to sparsify $C_n : \|C_n\|_0$ (6)

The dictionary ϕ' is a trained dictionary and obtained by 3D complex wavelet transform (CWT) of 3D pilot data, $Y_p$:

$$\emptyset'(x,y,z,s,ori,ri) = CWT(Y_p(x,y,z)) \quad (7)$$

Where $Y_p$ is the pilot data; (x,y,z) are the 3D coordinate variables; s is the scale, ori is the orientation, and ri is the real and imaginary parts after 3D CWT. φ is a 3D complex wavelet dictionary, which will be discussed below. The $d_n$ are the complex coefficients of the 3D complex wavelet transform of $Y_p$.

An example of imposing a sparse non-linear condition using a data-driven dictionary, for an input 3D data can be expressed as:

$$CWT(Y_{obs}) = \sum_{n \subset I_k} C'_n \varphi_n(x, y, z) \quad (9)$$

The $L_0$ norm in Equation (6) for satisfying the sparse condition is defined by:

$$C_n = C'^* |d|/|C'| = 0 \text{ (when } C' \text{ and } d \text{ are in phase)} \quad (10)$$

Otherwise, where |C'| and |d| are the absolute amplitude of coefficients C'i and di respectively. $C_n$ is a function of variables (t,x,y,s,ori) and therefore the approximation (4) is non-linear solution. Since $\emptyset_n(x, y, z)$ in Equation (4) is not orthogonal, it will introduce artefacts when hard thresholding (implied by Equation (10)) is executed. In order to reduce the potential artefacts, one or more embodiments of the present invention can introduce amplitude envelope scaling so that Equation (10) becomes:

$$C_n = C'^* |d|/|C'| = C'/(\|C'\| + \|d\|) \text{ (when } C' \text{ and } d \text{ are in phase)} \quad (11)$$

Otherwise, where |d| and |C'| are:

$$\|d\| = \sqrt{d_r^2 + d_{im}^2} \quad \|C\| = \sqrt{C_r'^2 + C_{im}'^2}$$

Where $d_r$ ($C'_r$) and $d_{im}$ ($C'_{im}$) are the real and imaginary coefficients, respectively.

Equation (11) is not intended to replace coefficients of input data, but to make the amplitude of the coefficient close to the pilot data coefficient when they are in phase; otherwise, scale data coefficients down by the amplitude envelope with a condition of $(\|C\|+\|d\|)>1$.

Figure 7:
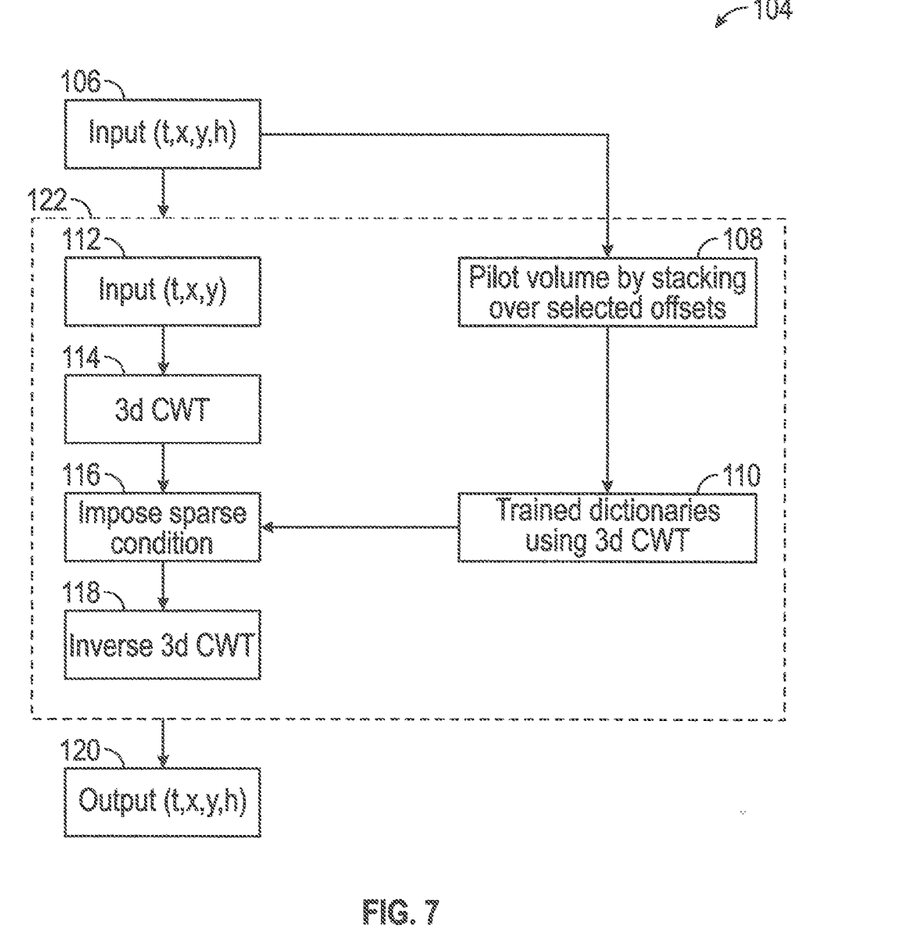
FIG. 7 illustrates a method representative of conditioning of seismic data, in accordance with embodiments presented herein.

An implementation of the above techniques for a sparse non-linear solution (SNLS) is presented in conjunction with FIG. 7. FIG. 7 illustrates a method 104 in which input seismic data is conditioned. Method 104 can be performed via the computing system 60 (and more specifically, the processor 64 operating in conjunction with at least one of the memory 66 or the storage 68, for example, by executing code or instructions to carry out the steps of method 104). In step 106, input data is received as a set of seismic data inclusive of a plurality of input volumes. Each input volume includes 3D seismic data inclusive of positional information (e.g., depth t, x-coordinate, and y-coordinate information) and an additional attribute that is related to the input volume, for example, offset data (e.g., h, otherwise referred to as an offset). Accordingly, the input volumes may each include, for example, angle, azimuth, and/or offset gathers (a plurality of offsets) in additional to positional information. The method 104 utilizes the input data received in step 106 to generate a pilot volume in step 108 and while the process in method 104 is described in conjunction with offsets, other additional attributes (separate from the offset data) related to the input data received in step 106, such as angle or azimuth, may substituted for the offset data described below.

For example, in step 108, for each given offset image volume (t,x,y) (i.e., a particular input volume having a corresponding offset), a pilot volume is computed by stacking offsets in the neighborhood of a current offset (i.e., stacking the image volumes of the offsets selected to be equal to or less than a selected threshold value different from the current offset for which an improved signal-noise ratio (SNR) is being generated). The image volumes of the offsets stacked in step 108 have a commonality in that the 3D geologic structure in the seismic image doesn't change over the offset dimension (i.e., offset values that have a value equal to or less than the threshold value with respect to the current offset selected have an invariant geological feature 90 between one another). The pilot volume generated is stacked as a moving average, which allows for improved SNR relative to any individual offset volume. In some embodiments, the threshold may be selected by, for example, a user or via instructions executed by the computing system 60 as a defined range or value so as to select which offset values will be gathered from the input data of step 106 and utilized in step 108. Likewise, for example, a user or instructions executed by the computing system 60 may select a number of offsets (i.e., corresponding to a number of input volumes) to be included from the input data of step 106 for stacking of their image volumes into the pilot volume in step 108 and the offsets closest in value to the current offset for which an improved SNR is being generated can be gathered for stacking of their image volumes in step 108.

Step 108 may be repeated for each offset value (i.e., the offset value for each input volume of the input data of step 106). In this manner, for each offset value ("h") in the input data of step 106, a corresponding pilot volume is generated in step 108. Alternatively, multiple pilot volumes can be generated in conjunction with each offset value in the input data of step 106, for example, based on the selected range of values utilized to choose the offsets applied in generating pilot volumes in step 108. In conjunction with step 108, for the image volume of each offset chosen to be included in the gather, the entire 3D volume of the geological feature 90 is included. Thus, a full 3D volume of the geological feature 90 is selected in conjunction with selection of offsets for use in step 108.

Figure 8:
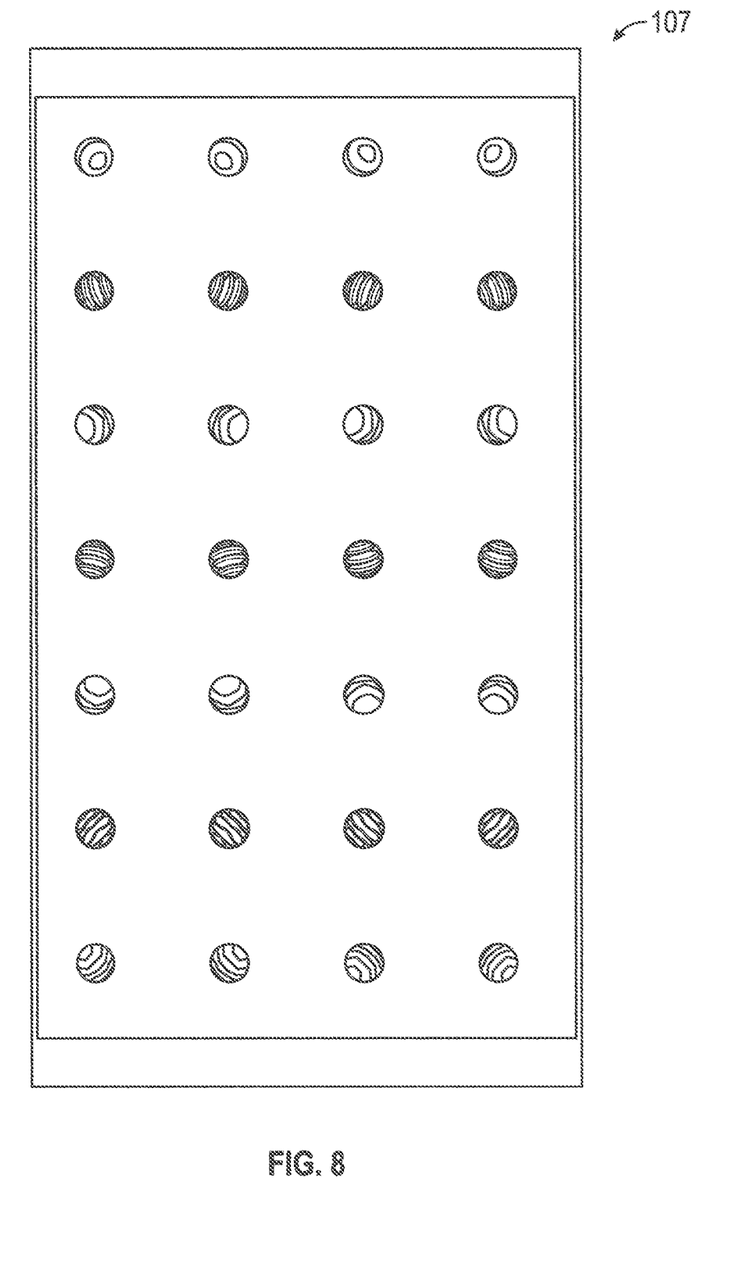
FIG. 8 illustrates an example of a 3D complex wavelet basis for use with the method of FIG. 7, in accordance with embodiments presented herein.

Each pilot volume generated in step 108 is utilized in step 110 to generate trained dictionaries (i.e., basis functions) upon undergoing a transformation, for example, a wavelet transformation such as a 3D complex wavelet transformation (CWT). The dictionaries generated in step 110 are generated utilizing a 3D CWT as this technique of transform provides multiresolution, sparse representation, and generates dictionaries that are translation-invariant (so as to reduce artifacts introduced during modification of wavelet coefficients). Accordingly, a complex wavelet dictionary (illustrated in FIG. 8) that is a complex-valued extension of the discrete wavelet transform is utilized. The complex-wavelength basis can be replaced by any 3D wavelength basis as long as it has 3-D localized representation, 3-D orientation, and/or a 3-D translation-invariant property. The complex wavelet transform uses complex-valued filtering that decomposes real signals into real and imaginary parts in the transform domain. The real and imaginary coefficients satisfy the Hilbert relation; that is, that the two are related by a 90 degree phase shift and have zero negative valued frequencies. These criteria are used to compute amplitude and local phase information, have limited redundancy, and are independent of the number of scales (e.g., 8:1 for 3D).

Figure 9:
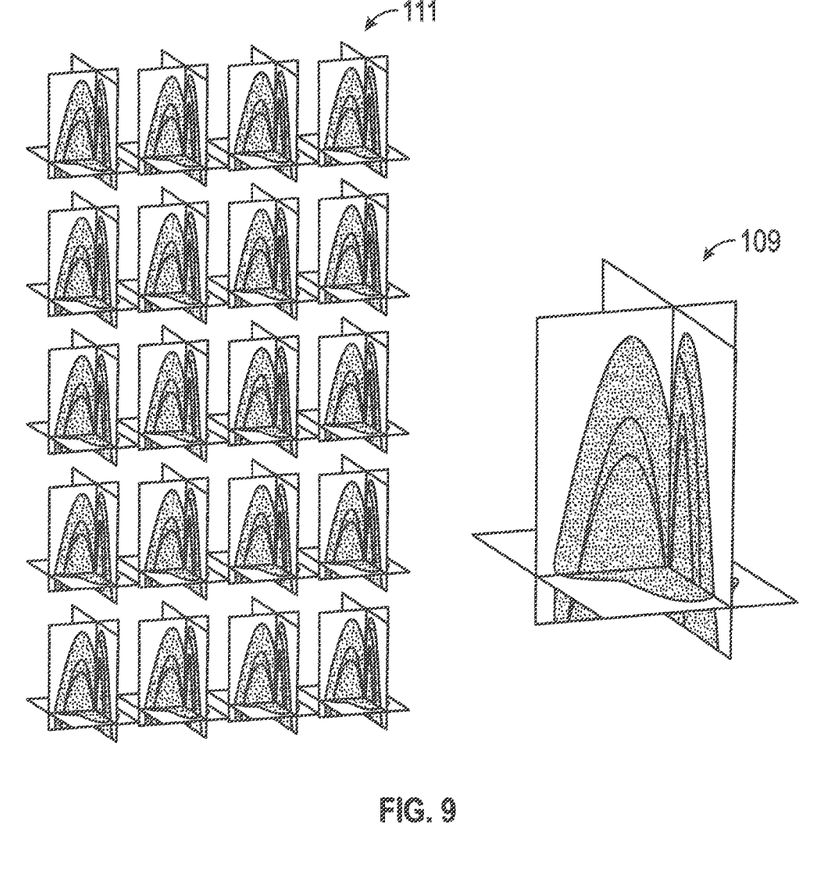
FIG. 9 illustrates a representation of a transformation of a gather in conjunction with the method of FIG. 7, in accordance with embodiments presented herein.

A single coefficient represents a wavelet in time for 1D, a 'needle' wavelet in 2D, and a 'pancake' wavelet in 3D. In the 3D complex wavelet transform, the coefficient has a pancake shape and 28 orientations 107, as illustrated FIG. 8, for the real part. For example, there are a total of 168 volumes for three scales and 56 orientations of the real and imaginary parts, each of which represents the unique aspect of the input volume. For an input gather 109 (an example of which is illustrated in FIG. 9), 28 orthogonal orientations 111 are obtained over the basis function (FIG. 8) after 3D complex wavelet transform. Further, each coefficient has a phase, amplitude, scale, azimuth, and dip attached to it. Representing data in this way provides a platform upon which designed trained dictionaries and sparse conditioning can be performed on in conjunction with step 116 of FIG. 7, as discussed in greater detail below.

In step 112, input data (a particular input volume) corresponding to a particular offset is selected from the input data received in step 106 as selected input data. This selected input data of step 112 is transformed in step 114 from the data domain to the CWT domain (e.g., a wavelet domain) through application of a 3D CWT to the selected input data of step 112. Sparse conditioning of this transformed data of step 114 is imposed in step 116. Thus, in step 116 for example, the sparse conditioning of Equations (6) and (11) are imposed over the coefficients of the transformed data from the 3D CWT of step 114.

It should be noted that the trained dictionary applied in step 116 to the transformed data from the 3D CWT of step 114 corresponds to the pilot volume generated in step 108 for the respective offset that corresponds to the selected input data of step 112. That is, for each selected input data of step 112, the computing system 60 (and more specifically, the processor 64 operating in conjunction with at least one of the memory 66 or the storage 68, for example, by executing code or instructions) applies a trained dictionary from step 110 that is based on the pilot volume generated in conjunction with the offset value of the selected input data of step 112. In this manner, the sparse conditioning in step 116 includes imposing the sparse conditioning of the transformed data of step 114 in the 3D CWT domain with reference to the pilot volume in the 3D CWT domain as the dictionary corresponding to the selected input data of step 112. By use of the particularly selected dictionary (basis function) of step 110 in step 116, the transformed data of step 114 becomes sparsely represented data (sparsified data) in step 116, whereby a relatively low number of coefficients are used to reflect the transformed data of step 114.

In some embodiments, an L0 norm may be the technique utilized for sparsification in step 116 of the transformed data from step 114. The L0 norm allows for the transformed data from step 114, as seven dimensional data, to be sparsified by keeping the live coefficients (zeroing out the remainder). However, other techniques for sparsification (e.g., L1 norm, L2 norm) may instead be utilized.

The above described steps may be used to reduce an amount of noise present in the selected input data of step 112. The input data of step 106 is seismic data that includes seismic signals and noise. Thus the selected input data of step 112 also includes noise. By imposing a sparse condition in step 116, the seismic signal may be identified while noise is reduced, thus improving its SNR, since the dictionary has dominant values of the seismic signal relative to noise (based upon the stacking of values over selected offsets in step 108). That is, as the pilot volume generated in step 108 includes signal values for a plurality of stacked volumes of offsets for a given geological feature 90, the strength of the signal relative to noise in the pilot volume for a given offset is increased. By using this pilot volume having an increased signal relative to the image volume of an offset value alone to generate a dictionary in step 110, and by applying that generated dictionary in step 116, the transformed data of step 114 has a sparse condition imposed consistent with an increased value of signal (from the dictionary generated in step 110) relative to the signal of the transformed data of step 114. This generates sparsely represented data from step 116 that has an increased SNR relative to the transformed data of step 114.

In step 118, an inverse transform, e.g., a 3D CWT, is performed. In step 116, the sparse condition is imposed in the CWT domain (i.e., sparsification is performed on the coefficients of the transformed data of step 114 in the 3D CWT domain). Thus, applying an inverse 3D CWT operation in step 118 generates data (i.e., output data represented in step 120) in the data domain (e.g., from the wavelet domain), which can be used for further seismic processing. When the further processing includes AVO, the output data in step 120 will not have an altered underlying AVO signature, since the trained dictionaries from step 110 are based on the moving-average pilot, as shown in Equation (10). However, this could change based on the number of offsets used to generate the pilot volume in step 108 (i.e., large numbers of offsets utilized in step 108 change the AVO of the output data in step 120).

The process described above, can an iterative process 122 that is applied to each respective selected input data of step 112 of the received data from step 106. For example, each offset of the input data received in step 106 is individually passed to the iterative process 122 as selected input data of step 112 and each offset corresponding to the input volume that is selected as the selected input data of step 112 is also utilized in step 108. That is an offset of the input data of step 106 is selected for processing in the iterative process 122 (i.e., the two illustrated paths of the iterative process 122 are performed simultaneously or in near-real time), followed by a second offset of the input data of step 106 for processing in the iterative process 122, and so forth until each offset of the input data of step 106 has passed through the iterative process 122 to collectively generate the output data of step 120.

In some embodiments, the offset of the input data of step 106 that is selected for processing in the iterative process 122 as selected input data of step 112 operates as the offset that generates the pilot volume through the stacking of the offsets in the neighborhood of the selected offset (i.e., offsets selected to be equal to or less than a selected threshold value different from the selected offset for which an improved SNR is being generated). Step 110 can be performed in conjunction with (at the same or substantially the same time as), before, or after step 114 is performed. Thereafter, step 116 and 118 are performed and the data generated can either be output as a portion of the output data of step 120 or stored (queued or cached) until the remaining data of the output data 120 has been generated (so that all of the generated data may be transmitted together as the output data of step 120).

The above described steps of the iterative process 122 may be repeated for a second offset of the input data of step 106 for processing in the iterative process 122 (i.e., where a new pilot volume corresponding to the second offset of the input data is generated in step 108, a new dictionary is generated based on that pilot volume in step 110 and applied in step 116 to the transformed data of step 114). Thereafter, step 116 and 118 are performed and the data generated can again either be output as a portion of the output data of step 120 or stored (queued or cached) until the remaining data of the output data 120 has been generated (so that all of the generated data may be transmitted together as the output data of step 120). This process can be repeated for each successive offset of the input data of step 106 has passed through the iterative process 122 to collectively generate the output data of step 120.

Alternatively, the iterative process 122 may instead iteratively generate a pilot volume for each offset of the input data of step 106 by repeating step 108 for each input offset value (i.e., for each offset corresponding to one input volume of the input data of step 106). The set of pilot volumes may then be trained into dictionaries by repeating step 110 for each pilot volume generated in step 108. These dictionaries may be stored as a library of dictionaries, for example, in memory 66 and/or in storage 68. Respective dictionaries may then be selected from the library of dictionaries by the processor 64 (for example, by executing code or instructions causing a particular dictionary associated with selected input data of step 112 to be accessed) and applied in step 116, as described above.

In another embodiment, the iterative process 122 may iteratively generate a pilot volume for each offset of the input data of step 106 by performing step 108 for an input offset value. The generated pilot volume from step 108 may then be trained into a dictionary in step 110. This dictionary may be stored as a portion of the library of dictionaries, for example, in memory 66 and/or in storage 68. Subsequently, a second input offset value of the input data of step 106 may be used in conjunction with step 108 to generate a second pilot volume, which is trained in step 110 and stored as another dictionary in the library of dictionaries. This process can be repeated for all offset values of the input data of 106 to complete the library of dictionaries. Once completed, respective dictionaries may then be selected from the library of dictionaries by the processor 64 (for example, by executing code or instructions causing a particular dictionary associated with selected input data of step 112 to be accessed) and applied in step 116, as described above. In this manner, dictionaries may either be selected from a library of dictionaries or a dictionary may be generated in real time or in near real time, (i.e., in conjunction with the performance of step 114) for application in step 116.

Regardless of which technique is used to train and apply the dictionaries in method 104, the SNLS process of method 104 described is not performed on a gather (e.g., a common mid-point (CMP) gather), but rather on each 3D offset volume (as the input volumes of the input data of step 106) independently. A CMP gather performed after the above described SNLS process has the advantage of significant SNR improvement compared to a CMP gather on the raw input (e.g., the input data of step 106). Use of the SNLS process of method 104 also has advantages, for example, near-offset noise has been recognized as a challenging problem because of sparse reflections at targets. Typically, removal of this noise can be complicated because there is almost no differentiable moveout between primaries (e.g., primary seismic signals) and noise that can be used for conventional 2D processing methods, which can include FK filtering and the Radon transform. However, through the use of the SNLS processes described in conjunction with method 104 (e.g., utilizing a 3D offset volume and a trained dictionary of the pilot volume progressively generated over the offset dimension), near-offset noise can be reduced via differences primary and multiples among different offsets being captured utilized in the SNLS process.

Even though the SNLS process of method 104 is performed over the entire 3D space of each offset volume independently, the sparse conditioning is relative to the same trained dictionaries for the entire range of offsets used to generate the pilot volume; therefore, CMPs within the same pilot neighborhood may have some influence on each other. Based on the assumption that 3D geologic structure is continuous over the offset dimension, since CWT decomposes the data into multi-dimensional space, which includes both physical space in two and three dimensions, and signal property space, such as time-frequency, space-wavenumber, and dip or orientation space, the coefficient modification after imposing sparse conditioning on Equation (11) would impact the signal properties, such as frequency and wavenumber contents, orientation, and location in 3D space at same time. This suggests that method 104 is adaptive to the data bandwidth and does not wipe out frequencies and wavenumbers, in contrast to bandpass or FK filtering.

The offset range used to generate the pilot volume in step 108 is the only selected parameter to be provided. If only a single offset is used as the pilot, method 104 does not change the input because the trained dictionary is itself. On other hand, if the full range of offsets are used to stack for the pilot volume in step 108, the outcome would be extremely aggressive because the difference between any individual offset stack and the full stack is potentially very large. Examples of offset selection include one-third of the full offset range for the pilot, which has been shown to preserve the AVO signature (dependent on the offset dimension and geometry). The more aggressive the pilot choice (i.e., the larger number of offsets utilized in step 108), the higher the likelihood that method 104 will change the AVO signature.

The method of 104 is efficient when automated, and results in quick run times and dramatic cycle time reduction. Using a single input parameter can improve SNR, interpolate the holes, and attenuate multiples simultaneously. There is no specific design required by the flow for interpolation and extrapolation. Method 104 also aids in balancing amplitudes and frequencies and improving time alignment, for example, due to fundamental sparse representation over the trained dictionaries, which accurately captures the wavefield characteristics.

Thus, present embodiments include a non-linear seismic data conditioning technique using a combination of 3D complex wavelet transform, sparse conditioning (e.g., using an $L_0$ norm), and trained dictionaries from a pilot volume. Based on the principle that 3D geology is continuous over the offset dimension, the technique works on each offset or angle volume independently and there is no 2D gather based process. The technique improves signal-to-noise ratios significantly while preserving valuable seismic attributes, including AVO signature. Additionally, the uplift is very significant on gathers generated and the technique is highly effective at attenuating coherent noises, including multiples, making it a good alternative to utilizing Radon transforms. Since the number of offsets to include in the pilot volume in step 108 is the only selected parameter, the technique can be highly automated and provide a fast turnaround that leverages available computer resources. The technique is able to preserve azimuthal time shifts when the pilot volume is selected within a single azimuth, and does not mix between azimuths. Additionally, it is worth highlighting the interpolation function of the technique; even if there are data holes present between adjacent offsets, the coefficient modification in the 3D complex wavelet transform domain will impact the adjacent area in the data space (i.e., effectively providing interpolation thereof).

Utilizing the current method 104, many processing steps utilized in previous techniques (e.g., 2D local sequential flows) may be reduced and/or eliminated including denoise processing, residual moveout analysis (correction), trim static correction, and balancing (e.g., frequency and/or amplitude balancing), and multiple suppression to further increase the efficiency gains described above. The present techniques provide for the use of 3D data, does not require any assumption of a flattened gather, utilizes a 3D pilot volume that progressively constructed by stacking over selected offsets or angles, applies a 3D complex wavelet transform, utilizes sparse conditioning (e.g., using an $L_0$ norm to sparsify the representation of data), and has advantages relative to a Radon transform for removal of noise, such as multiples.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . ." or "step for [perform]ing [a function] . . .", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A computer-implemented method, comprising:
   receiving a set of seismic data acquired via a seismic survey system, wherein the set of seismic data comprises at least one of undesired noise or undesired artifacts and further comprise a plurality of input volumes, wherein each respective input volume of the plurality of input volumes comprises positional data;

selecting a first input volume of the plurality of input volumes having a first additional attribute as one of an offset, angle, or azimuth related to the first input volume;

generating a pilot volume by selecting a range of input volumes of the plurality of input volumes based on attribute values of the plurality of input values and stacking input volumes of the range of input volumes with the first input volume;

generating a trained dictionary based upon transformation of the pilot volume;

transforming the first input volume into transformed data;

imposing a sparse condition on the transformed data utilizing the trained dictionary to generate sparsified data; and inverse transforming the sparsified data to generate an output data volume as a portion of a set of modified seismic data, wherein the output data volume has an improved signal-to-noise ratio relative to the set of seismic data.

2. The computer-implemented method of claim 1, comprising selecting the range of input volumes based on a value of an additional attribute for each input volume of the range of input volumes being equal to or less than a threshold value.

3. The computer-implemented method of claim 2, the additional attribute for each input volume of the range of input volumes corresponds to a respective offset, angle, or azimuth.

4. The computer-implemented method of claim 1, wherein a 3D complex wavelet transform (CWT) is utilized in transformation of the pilot volume.

5. The computer-implemented method of claim 1, wherein a sparse non-linear approximation is utilized to impose the sparse condition.

6. The computer-implemented method of claim 1, wherein the transformed data is transformed into a wavelet domain, wherein the sparsified data is inverse transformed into a data domain.

7. The computer-implemented method of claim 1, comprising generating a second pilot volume by selecting a second range of input volumes of the plurality of input volumes and stacking input volumes of the range of input volumes with a second input volume of the plurality of input volumes.

8. The computer-implemented method of claim 7, comprising generating a second trained dictionary based upon transformation of the second pilot volume and logging the second trained dictionary with the trained dictionary as portions of a library.

9. The computer-implemented method of claim 8, wherein utilizing the trained dictionary comprises selecting the trained dictionary from the library.

10. The computer-implemented method of claim 8, comprising:

transforming the second input volume of the plurality of input volumes into second transformed data;

imposing the sparse condition on the second transformed data utilizing the second trained dictionary selected from the library to generate second sparsified data; and inverse transforming the second sparsified data to generate an second output data volume as a second portion of the set of modified seismic data.

11. The computer-implemented method of claim 10, comprising:

storing the output data volume and the second output data volume as the set of modified seismic data; and transmitting the set of modified seismic data to be utilized in seismic processing to explore for hydrocarbons within at least a portion of a predetermined volume of Earth.

12. The computer-implemented method of claim 1, comprising:

selecting a second input volume of the plurality of input volumes having a second additional attribute;

generating a second pilot volume by selecting a second range of input volumes of the plurality of input volumes and stacking input volumes of the second range of input volumes with the second input volume;

generating a second trained dictionary based upon transformation of the second pilot volume;

transforming the second input volume into second transformed data;

imposing the sparse condition on the second transformed data utilizing the second trained dictionary to generate second sparsified data; and inverse transforming the second sparsified data to generate an second output data volume as a second portion of the set of modified seismic data.

13. The computer-implemented method of claim 12, comprising selecting the second range of input volumes based on a second value of an additional attribute for each input volume of the second range of input volumes being equal to or less than a second threshold value.

14. A tangible, non-transitory, machine-readable media, comprising instructions that when executed cause a processor to:

receive a set of seismic data acquired via a seismic survey system, wherein the set of seismic data comprises at least one of undesired noise or undesired artifacts and further comprises a plurality of input volumes, wherein each respective input volume of the plurality of input volumes comprises positional data;

select a first input volume of the plurality of input volumes having a first additional attribute as one of an offset, angle, or azimuth related to the first input volume;

generate a pilot volume by selecting a range of input volumes of the plurality of input volumes based on attribute values of the plurality of input values and stacking input volumes of the range of input volumes with the first input volume;

generate a trained dictionary based upon transformation of the pilot volume;

transform the first input volume into transformed data;

impose a sparse condition on the transformed data utilizing the trained dictionary to generate sparsified data; and inverse transform the sparsified data to generate an output data volume as a portion of a set of modified seismic data, wherein the output data volume has an improved signal-to-noise ratio relative to the set of seismic data.

15. The tangible, non-transitory, machine-readable media of claim 14, comprising instructions that when executed cause the processor to: generate a second pilot volume by selecting a second range of input volumes of the plurality of input volumes and stack input volumes of the range of input volumes with a second input volume of the plurality of input volumes.

19

16. The tangible, non-transitory, machine-readable media of claim 15, comprising instructions that when executed cause the processor to: generate a second trained dictionary based upon transformation of the second pilot volume and log the second trained dictionary with the trained dictionary as portions of a library.

17. The tangible, non-transitory, machine-readable media of claim 16, comprising instructions that when executed cause the processor to:
- transform the second input volume of the plurality of input volumes into second transformed data;
- impose the sparse condition on the second transformed data utilizing the second trained dictionary selected from the library to generate second sparsified data;
- inverse transform the second sparsified data to generate an second output data volume as a second portion of the set of modified seismic data;
- store the output data volume and the second output data volume as the set of modified seismic data; and
- transmit the set of modified seismic data to be utilized in seismic processing to explore for hydrocarbons within at least a portion of a predetermined volume of Earth.

18. The tangible, non-transitory, machine-readable media of claim 14, comprising instructions that when executed cause the processor to:
- select a second input volume of the plurality of input volumes having a second additional attribute as one of a second offset, second angle, or second azimuth related to the second input volume;
- generate a second pilot volume by selecting a second range of input volumes of the plurality of input volumes and stacking input volumes of the second range of input volumes with the second input volume;
- generate a second trained dictionary based upon transformation of the second pilot volume;
- transform the second input volume into second transformed data;
- impose the sparse condition on the second transformed data utilizing the second trained dictionary to generate second sparsified data; and
- inverse transform the second sparsified data to generate an second output data volume as a second portion of the set of modified seismic data.

19. A device, comprising:
a processor that when in operation:
- receives a set of seismic data acquired via a seismic survey system, wherein the set of seismic data comprises at least one of undesired noise or undesired artifacts and further comprises a plurality of input volumes, wherein each respective input volume of the plurality of input volumes comprises positional data;
- selects a first input volume of the plurality of input volumes having a first additional attribute as one of an offset, angle, or azimuth related to the first input volume;
- generates a pilot volume by selecting a range of input volumes of the plurality of input volumes based on attribute values of the plurality of input values and stacking input volumes of the range of input volumes with the first input volume;
- generates a trained dictionary based upon transformation of the pilot volume;
- transforms the first input volume into transformed data;
- imposes a sparse condition on the transformed data utilizing the trained dictionary to generate sparsified data; and
- inverse transforms the sparsified data to generate an output data volume as a portion of a set of modified seismic data, wherein the output data volume has an improved signal-to-noise ratio relative to the set of seismic data.

20. The device of claim 19, wherein the processor when in operation:
- selects a second input volume of the plurality of input volumes having a second additional attribute as one of a second offset, second angle, or second azimuth related to the second input volume;
- generates a second pilot volume by selecting a second range of input volumes of the plurality of input volumes and stacking input volumes of the second range of input volumes with the second input volume;
- generates a second trained dictionary based upon transformation of the second pilot volume;
- transforms the second input volume into second transformed data;
- imposes the sparse condition on the second transformed data utilizing the second trained dictionary to generate second sparsified data;
- inverse transforms the second sparsified data to generate an second output data volume as a second portion of the set of modified seismic data; and
- transmits the set of modified seismic data to be utilized in seismic processing to explore for hydrocarbons within at least the portion of a predetermined volume of Earth.

* * * * *